United States Patent
Kim et al.

(10) Patent No.: US 8,500,585 B2
(45) Date of Patent: Aug. 6, 2013

(54) POWER TRANSMISSION SYSTEM OF HYBRID ELECTRIC VEHICLE

(75) Inventors: Baekyu Kim, Suwon-si (KR); Jang Mi Lee, Tongyeong-si (KR); Sungik Bae, Suwon-si (KR); Yeonho Kim, Suwon (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/308,797

(22) Filed: Dec. 1, 2011

(65) Prior Publication Data

US 2012/0322601 A1 Dec. 20, 2012

(30) Foreign Application Priority Data

Jun. 20, 2011 (KR) .................. 10-2011-0059758

(51) Int. Cl.
*F16H 3/72* (2006.01)
(52) U.S. Cl.
USPC .............................................. 475/5; 475/282
(58) Field of Classification Search
USPC .............................................. 475/5, 275–291
See application file for complete search history.

(56) References Cited

U.S. PATENT DOCUMENTS

| 2006/0111213 A1* | 5/2006 | Bucknor et al. .................. 475/5 |
| 2006/0240928 A1* | 10/2006 | Raghavan et al. ............... 475/5 |
| 2007/0197335 A1* | 8/2007 | Raghavan et al. ............... 475/5 |
| 2011/0053724 A1 | 3/2011 | Phillips |
| 2012/0052999 A1* | 3/2012 | Kim et al. ..................... 475/149 |

FOREIGN PATENT DOCUMENTS

| JP | 4007403 B1 | 9/2007 |
| JP | 4102423 B2 | 3/2008 |
| JP | 2009-190455 A | 8/2009 |
| KR | 10-2010-0101306 A | 9/2010 |
| KR | 10-2011-0006907 A | 1/2011 |
| KR | 10-2011-0062140 A | 6/2011 |

* cited by examiner

*Primary Examiner* — Justin Holmes
*Assistant Examiner* — Huan Le
(74) *Attorney, Agent, or Firm* — Morgan, Lewis & Bockius LLP

(57) ABSTRACT

A power transmission system of a hybrid electric vehicle may include an input shaft, a first planetary gear set having a third rotation element fixedly connected to the input shaft and a second rotation element fixedly connected to a first motor/generator, a second planetary gear set having a fourth rotation element selectively connected to the second rotation element, a fifth rotation element directly connected to the first rotation element, and a sixth rotation element fixedly connected to a second motor/generator, an output gear connected to the fifth rotation element, a first clutch selectively connecting the second rotation element with the fourth rotation element, a second clutch adapted to selectively connect the third rotation element with the second motor/generator, a first brake interposed between the fourth rotation element and a transmission housing, and a second brake interposed between the sixth rotation element and the transmission housing.

4 Claims, 10 Drawing Sheets

FIG. 2

| Mode | | CL1 | CL2 | BK1 | BK2 | Speed Ratio [1:1.5/1:2] |
|---|---|---|---|---|---|---|
| Ev | | | | ON | | |
| Torque Split Mode | Input Split | | | ON | | |
| | Compound Split | ON | | | | |
| | Output Split | | ON | | | |
| Fixed Shift -speed Mode | Fixed First Speed (UD1) | ON | | | ON | 2.20 |
| | Fixed Second Speed (UD2) | | ON | ON | | 1.50 |
| | Fixed Third Speed (1:1) | ON | ON | | | 1.00 |
| | Fixed Fourth Speed (OD) | ON | | ON | | 0.40 |

POWER TRANSMISSION SYSTEM OF HYBRID ELECTRIC VEHICLE

CROSS-REFERENCE TO RELATED APPLICATION

The present application claims priority of Korean Patent Application Number 10-2011-0059758 filed in the Korean Intellectual Property Office on Jun. 20, 2011, the entire contents of which application is incorporated herein for all purposes by this reference.

BACKGROUND OF INVENTION

1. Field of Invention

The present invention relates to a power transmission system of a hybrid electric vehicle. More particularly, the present invention relates to a power transmission system of a hybrid electric vehicle which realizes three torque split modes and four fixed shift-speed modes.

2. Description of Related Art

Generally, a hybrid electric vehicle is a vehicle driven by at least two different types of power sources.

Such a hybrid electric vehicle typically includes an engine and a motor/generator. The hybrid electric vehicle uses a motor/generator having relatively better low-speed torque characteristics as a main power source at a low-speed and uses an engine having relatively better high-speed torque characteristics as a main power source at a high-speed.

Since the hybrid electric vehicle stops an operation of an engine using fossil fuel and uses a motor/generator at a low-speed region, fuel consumption may be improved and exhaust gas may be reduced.

The power transmission system of a hybrid electric vehicle is classified into a mono-mode type and a multi-mode type.

A torque delivery apparatus such as clutches and brakes for shift control is not necessary, but fuel consumption is high due to deterioration of efficiency at a high-speed region and an additional torque multiplication device is required for being applied to a large vehicle according to the mono-mode type.

Since the multi-mode type has high efficiency and is able to multiply torque autonomously, the multi-mode type can be applied to a full size vehicle.

Therefore, the multi-mode type instead of the mono-mode type is applied as the power transmission system of a hybrid electric vehicle and is also under continuous investigation.

The power transmission system of the multi-mode type includes a plurality of planetary gear sets, a plurality of motor/generators operated as a motor and/or a generator, a plurality of torque delivery apparatus controlling rotation elements of the planetary gear set, and a battery used as a power source of the motor/generators.

The power transmission system of the multi-mode type has different operating mechanisms depend on connections of the planetary gear sets, the motor/generators, and the torque delivery apparatus.

In addition, the power transmission system of the multi-mode type has different features such as durability, power delivery efficiency, and size depending on the connections of the planetary gear sets, the motor/generators, and the torque delivery apparatus. Therefore, designs for the connection structure of the power transmission system of a hybrid electric vehicle are also under continuous investigation.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention are directed to provide a power transmission system of a hybrid electric vehicle having advantages of realizing three torque split modes and four fixed shift-speed modes by using at least one of torque delivery apparatus.

An exemplary power transmission systems of a hybrid electric vehicle according to the present invention may include: an input shaft adapted to receive torque of an engine; a first planetary gear set having first, second, and third rotation elements, wherein the third rotation element is fixedly connected to the input shaft and the second rotation element is fixedly connected to a first motor/generator; a second planetary gear set having fourth, fifth, and sixth rotation elements, wherein the fourth rotation element is selectively connected to the second rotation element of the first planetary gear set, the fifth rotation element is directly connected to the first rotation element of the first planetary gear set, and the sixth rotation element is fixedly connected to a second motor/generator; an output gear connected to the fifth rotation element of the second planetary gear set; a first clutch adapted to selectively connect the second rotation element of the first planetary gear set with the fourth rotation element of the second planetary gear set; a second clutch adapted to selectively connect the third rotation element of the first planetary gear set with the second motor/generator; a first brake interposed between the fourth rotation element of the second planetary gear set and a transmission housing; and a second brake interposed between the sixth rotation element of the second planetary gear set and the transmission housing.

The first, second, and third rotation elements of the first planetary gear set may be a first sun gear, a first planet carrier, and a first ring gear respectively and the fourth, fifth, and sixth rotation elements of the second planetary gear set may be a second sun gear, a second planet carrier, and a second ring gear respectively.

Another exemplary power transmission systems of a hybrid electric vehicle according to the present invention may include: a first planetary gear set having a first sun gear, a first planet carrier, and a first ring gear as rotation elements thereof; a second planetary gear set having a second sun gear, a second planet carrier, and a second ring gear as rotation elements thereof; first and second motor/generators adapted to be operated as a motor or a generator; a torque delivery apparatus including first and second clutches and first and second brakes, wherein the first sun gear is directly connected to the second planet carrier, the first planet carrier is selectively connected to the second sun gear by interposing the first clutch therebetween and is directly connected to the first motor/generator, the first ring gear is connected to an input shaft and is selectively connected to the second motor/generator by interposing the second clutch therebetween, the second sun gear is selectively connected to a transmission housing through the first brake, the second planet carrier is connected to an output gear, and the second ring gear is directly connected to the second motor/generator and is selectively connected to the transmission housing through the second brake.

The first planetary gear set may be a double pinion planetary gear set, and the second planetary gear set may be a single pinion planetary gear set.

In various embodiments, the first brake may be operated at an Electric Vehicle (EV) mode, the first brake may be operated at an input split mode, the first clutch may be operated at a compound split mode, the second clutch may be operated at an output split mode, the first clutch and the second brake may be operated at a fixed first speed mode, the second clutch and the first brake may be operated at a fixed second speed mode, the first clutch and the second clutch may be operated at a fixed third speed mode, or the first clutch and the first brake may be operated at a fixed fourth speed mode.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operational chart of an exemplary torque delivery apparatus at each operation mode applied to an exemplary power transmission system according to the present invention.

DETAILED DESCRIPTION

Figure 1:
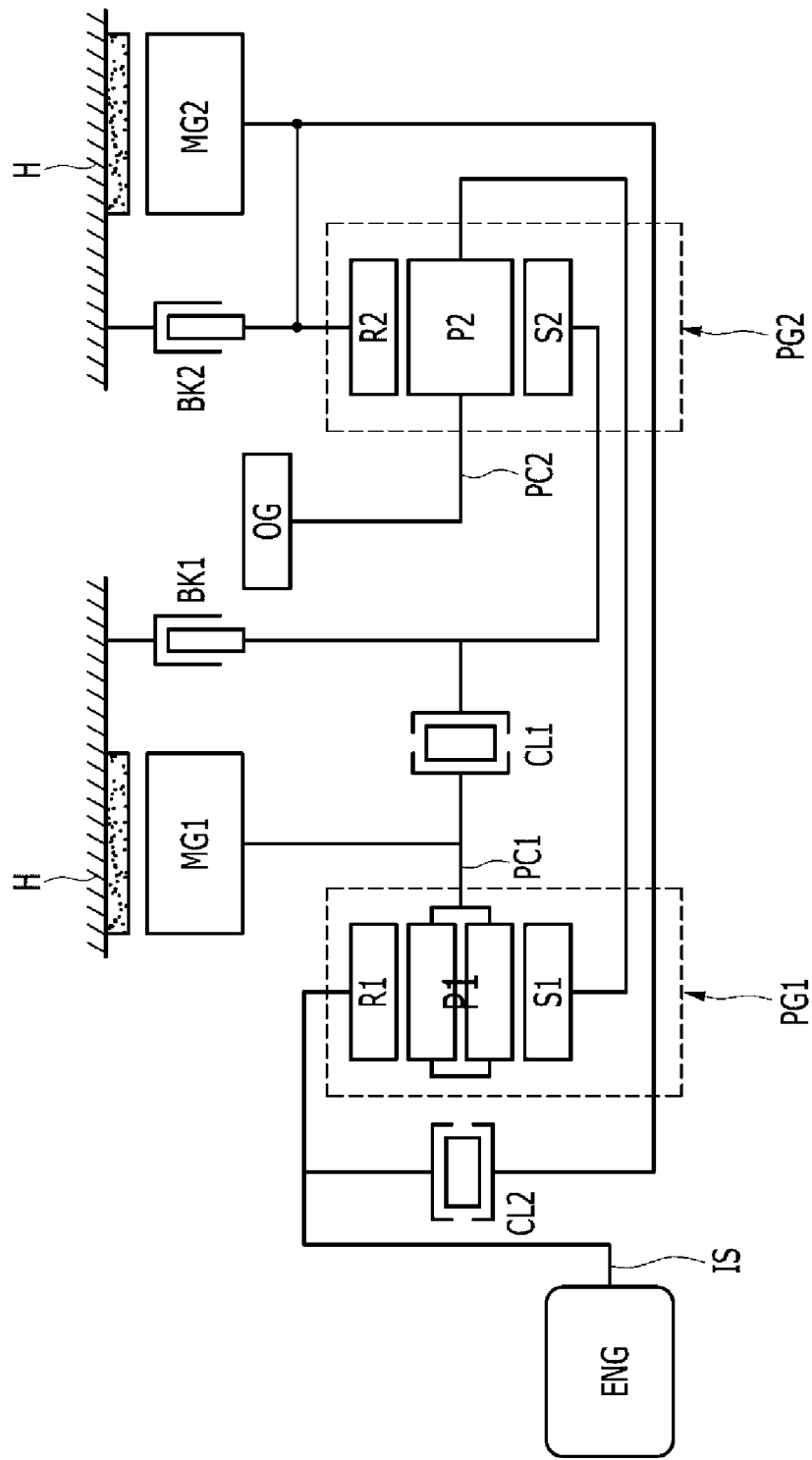
FIG. 1 is a schematic diagram of an exemplary power transmission system according to the present invention.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, exemplary embodiments of the present invention will be described in detail with reference to the accompanying drawings.

Description of components that are not necessary for explaining the present exemplary embodiments will be omitted, and the same constituent elements are denoted by the same reference numerals in this specification.

In the detailed description, ordinal numbers are used for distinguishing constituent elements having the same terms, and have no specific meanings.

Referring to FIG. 1, a power transmission system of a hybrid electric vehicle according to various embodiments of the present invention receives torque of an engine ENG that is a power source through an input shaft IS, changes the torque according to a running state of a vehicle, and outputs the changed torque through an output gear OG.

The power transmission system includes first and second planetary gear sets PG1 and PG2, first and second motor/generators MG1 and MG2, and a torque delivery apparatus comprising of first and second clutches CL1 and CL2 and first and second brakes BK1 and BK2.

A rotation element of the first planetary gear set PG1 is directly connected to a rotation element of the second planetary gear set PG2, and another rotation element of the first planetary gear set PG1 is selectively connected to another rotation element of the second planetary gear set PG2 such that the first planetary gear set PG1 and the second planetary gear set PG2 operate as one compound planetary gear set.

The first motor/generator MG1 and the second motor/generator MG2 are independent power sources, and are operates as a motor and a generator in an otherwise conventional manner.

The first motor/generator MG1 is connected to another rotation element of the first planetary gear set PG1 so as to operate as a motor supplying torque to another rotation element or to operate as a generator generating electricity by torque of another rotation element.

The second motor/generator MG2 is connected to the other rotation element of the second planetary gear set PG2 so as to operate as a motor supplying torque to the other rotation element or to operate as a generator generating electricity by torque of the other rotation element.

For this purpose, the first motor/generator MG1 and the second motor/generator MG2 have stators fixed to a transmission housing H and rotors connected to another rotation element of the first planetary gear set PG1 and the other rotation element of the second planetary gear set PG2, respectively.

The first clutch CL1 selectively connects another rotation element of the first planetary gear set PG1 with another rotation element of the second planetary gear set PG1, and the second clutch CL2 selectively connects the second motor/generator MG2 with the other rotation element of the first planetary gear set PG1.

In addition, the first brake BK1 is disposed in parallel with the first motor/generator MG1, and the second brake BK2 selectively connects the other rotation element of the second planetary gear set PG2 with the transmission housing H.

The first and second planetary gear sets PG1 and PG2 and the first and second motor/generators MG1 and MG2 are disposed on the same axis.

The torque delivery apparatus comprises the first and second clutches CL1 and CL2 and the first and second brakes BK1 and BK2, which are conventional multi-plate friction elements of wet type that are operated by hydraulic pressure. One will appreciate that other types of clutches and brakes can be used, such as friction elements of dry type.

Herein, a clutch is a friction member that connects a rotation member with another rotation member; a brake is a friction member that connects a rotation member with a non-rotation member.

Constituent elements of a power transmission system according to various embodiments of the present invention will be described in detail.

The first planetary gear set PG1 is a double pinion planetary gear set, and includes a first sun gear S1, a first ring gear R1, and a first planet carrier PC1 rotatably supporting a pair of first pinions P1 engaged with the first sun gear S1 and the first ring gear R1.

The second planetary gear set PG2 is a single pinion planetary gear set, and includes a second sun gear S2, a second ring gear R2, and a second planet carrier PC2 rotatably supporting a second pinion P2 engaged with the second sun gear S2 and the second ring gear R2.

The first sun gear S1 is directly connected to the second planet carrier PC2, the first planet carrier PC1 is selectively connected to the second sun gear S2, the first ring gear R1 is connected to the input shaft IS that is an input member, and the second planet carrier PC2 is connected to the output gear OG that is an output member.

The first motor/generator MG1 is directly connected to the first planet carrier PC1 of the first planetary gear set PG1 so as to drive the first planet carrier PC1 or to be operated as a generator.

The second motor/generator MG2 is connected to the second ring gear R2 of the second planetary gear set PG2 so as to drive the second ring gear R2 or to be operated as a generator.

The first clutch CL1 is disposed between the first planet carrier PC1 of the first planetary gear set PG1 and the second sun gear S2 of the second planetary gear set PG2 so as to selectively connect the first planet carrier PC1 with the second sun gear S2.

The second clutch CL2 is disposed between the first ring gear R1 of the first planetary gear set PG1 and the second ring gear R2 of the second planetary gear set PG2 so as to selectively connect the first ring gear R1 with the second ring gear R2 and the second motor/generator.

The first brake BK1 is disposed between the second sun gear S2 of the second planetary gear set PG2 and the transmission housing H so as to operate the second sun gear S2 as a selective fixed element.

The second brake BK2 is disposed between the second ring gear R2 of the second planetary gear set PG2 and the transmission housing H so as to operate the second ring gear R2 as a selective fixed element.

FIG. 2 is an operational chart of torque delivery apparatus at each operation mode applied to a power transmission system according to various embodiments of the present invention.

Referring to FIG. 2, torque delivery apparatus operated at each shift-speed will be described detail.

The first brake BK1 is operated at an Electric Vehicle (EV) mode. The first brake BK1 is also operated at an input split mode. The first clutch CL1 is operated at a compound split mode. The second clutch CL2 is operated at an output split mode. The first clutch CL1 and the second brake B2 are operated at a fixed first speed mode. The second clutch CL2 and the first brake B1 are operated at a fixed second speed mode. The first clutch CL1 and the second clutch CL2 are operated at a fixed third speed mode. The first clutch CL1 and the first brake BK1 are operated at a fixed fourth speed mode.

As described above, the power transmission system according to various embodiments of the present invention can realize one EV mode, three torque split modes, and four fixed shift-speed modes.

Figure 3:
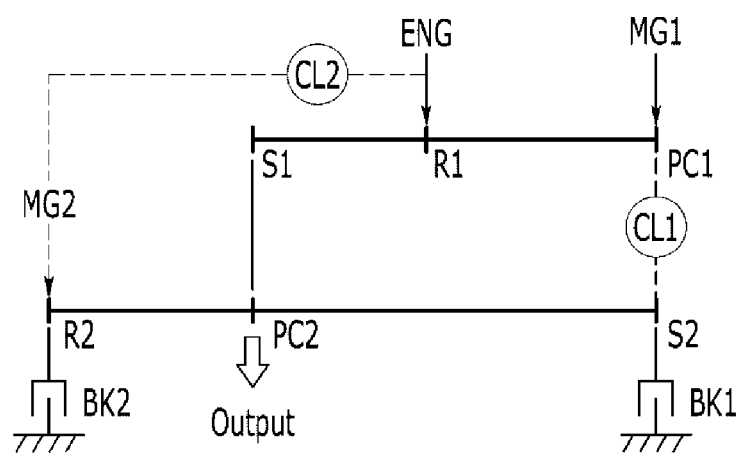
FIG. 3 is a schematic diagram showing connections between constituent elements of an exemplary power transmission system according to the present invention.
Figure 4:
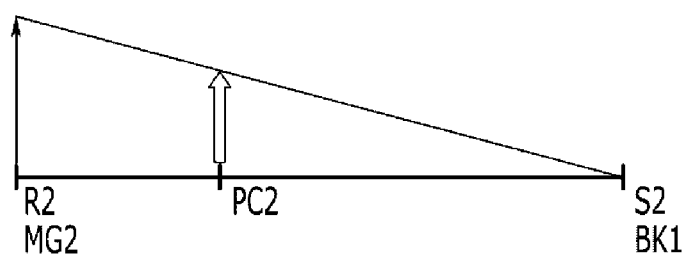
FIG. 4 is a lever diagram for an exemplary power transmission system according to the present invention at an Electric Vehicle (EV) mode and an input split mode.

FIG. 3 is a schematic diagram for showing connections between constituent elements of the power transmission system according to various embodiments of the present invention, and FIG. 4 is a lever diagram for a power transmission system according to various embodiments of the present invention at an EV mode and an input split mode.

Referring to FIG. 3 and FIG. 4, the first brake BK1 is operated at the EV mode and the input split mode.

The engine ENG maintains to be stopped, the first planetary gear set PG1 does not affect on the shifting, and the shifting is done by three rotation elements of the second planetary gear set PG2 at the EV mode.

That is, in a state that the second motor/generator MG2 operates so as to input torque thereof to the second ring gear R2, the second sun gear S2 is operated as a fixed element by operation of the first brake BK1 and a reduced speed is output through the second planet carrier PC2 that is the output element.

At this time, the first sun gear S1 is directly connected to the second planet carrier PC2 so as to receive torque of the second planet carrier PC2 in the first planetary gear set PG1, but the engine ENG is stopped and the first ring gear R1 is operated as the fixed element. Therefore, the first motor/generator MG1 rotates inversely.

In addition, if inverse rotation speed of the first motor/generator MG1 is reduced at the EV mode, the engine ENG starts and the input split mode is achieved.

Figure 5:
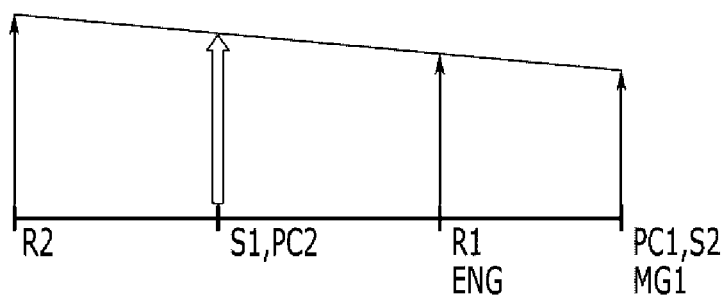
FIG. 5 is a lever diagram for an exemplary power transmission system according to the present invention at a compound split mode.

FIG. 5 is a lever diagram for a power transmission system according to various embodiments of the present invention at a compound split mode.

Referring to FIG. 3 and FIG. 5, the first clutch CL1 is operated at the compound split mode.

Then, the first and second planetary gear sets PG1 and PG2 are operated by four rotation elements, the first motor/generator MG1 and the second motor/generator MG2 are connected to the engine ENG or the output gear OG through the rotation elements of the planetary gear sets.

Therefore, the engine ENG, the first motor/generator MG1, and the second motor/generator MG2 can generate driving torque, one supplies torque to another so as to generate electricity, and all the speed ratios required for driving the vehicle can be obtained by changing their speeds suitably.

Figure 6:
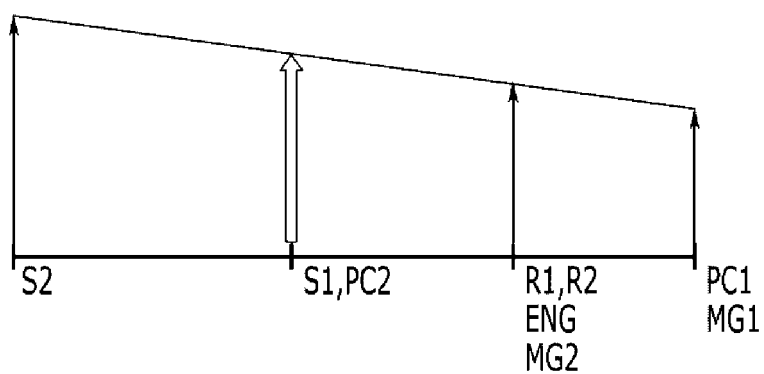
FIG. 6 is a lever diagram for an exemplary power transmission system according to the present invention at an output split mode.

FIG. 6 is a lever diagram for a power transmission system according to various embodiments of the present invention at an output split mode.

Referring to FIG. 3 and FIG. 6, the second clutch CL2 is operated at the output split mode.

Then, the first and second planetary gear sets PG1 and PG2 are operated by four rotation elements by operation of the second clutch CL2, high torque is input to the first ring gear R1 in a state that the second motor/generator MG2 and the engine ENG are directly connected, and shifting is performed by control of the first motor/generator MG1.

Figure 7:
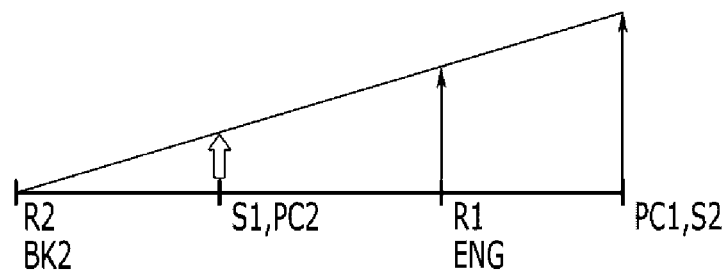
FIG. 7 is a lever diagram for an exemplary power transmission system according to the present invention at a fixed first speed mode.

FIG. 7 is a lever diagram for a power transmission system according to various embodiments of the present invention at a fixed first speed mode.

Referring to FIG. 3 and FIG. 7, the first clutch CL1 and the second brake BK2 are operated at the fixed first speed mode.

Then, the first planetary gear set PG1 and the second planetary gear set PG2 are operated by four rotation elements by operation of the first clutch CL1.

At this state, torque of the engine ENG is input to the first ring gear R1 of the first planetary gear set PG1 and the second ring gear R2 is operated as the fixed element by operation of the second brake B2. Therefore, a reduced speed by a predetermined speed ratio is output and the fixed first speed mode is achieved.

Figure 8:
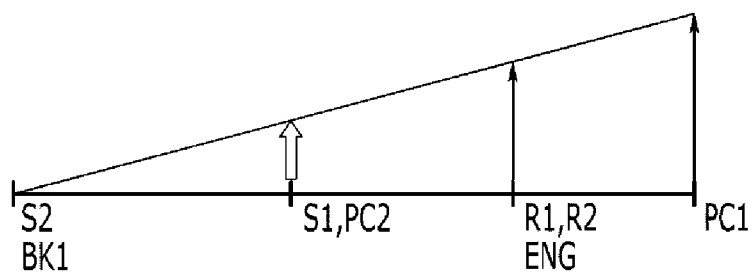
FIG. 8 is a lever diagram for an exemplary power transmission system according to the present invention at a fixed second speed mode.

FIG. 8 is a lever diagram for a power transmission system according to various embodiments of the present invention at a fixed second speed mode.

Referring to FIG. 3 and FIG. 8, the second clutch CL2 and the first brake BK1 are operated at the fixed second speed mode.

Then, the first and second planetary gear sets PG1 and PG2 are operated by four rotation elements by operation of the second clutch CL2.

At this state, torque of the engine ENG is input to the first ring gear R1 of the first planetary gear set PG1 and the second ring gear R2 of the second planetary gear set PG2, and the second sun gear S2 is operated as the fixed element by operation of the first brake B1. Therefore, a reduced speed by a predetermined speed ratio is output and the fixed second speed mode is achieved.

Figure 9:
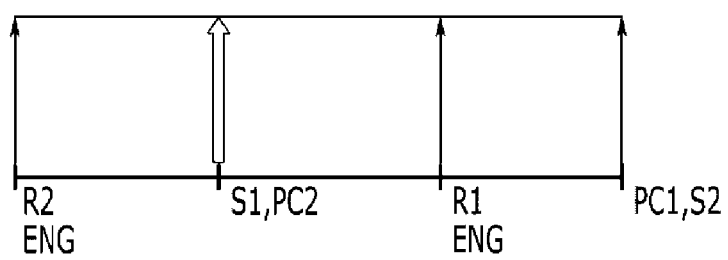
FIG. 9 is a lever diagram for an exemplary power transmission system according to the present invention at a fixed third speed mode.

FIG. 9 is a lever diagram for a power transmission system according to various embodiments of the present invention at a fixed third speed mode.

Referring to FIG. 3 and FIG. 9, the first clutch CL1 and the second clutch CL2 are operated at the fixed second speed mode.

Then, the first planetary gear set PG1 and the second planetary gear set PG2 become direct-coupling state and torque of the engine ENG is directly output. Therefore, the fixed third speed mode is achieved.

Figure 10:
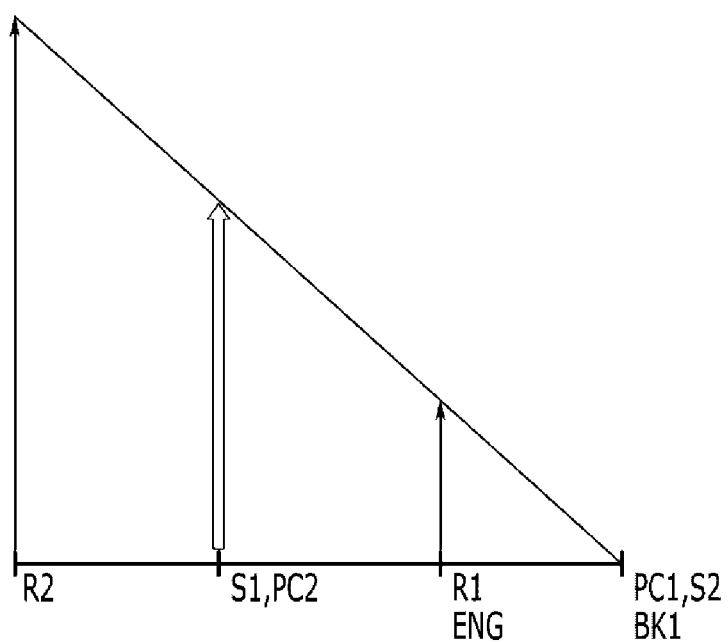
FIG. 10 is a lever diagram for an exemplary power transmission system according to the present invention at a fixed fourth speed mode.

FIG. 10 is a lever diagram for a power transmission system according to various embodiments of the present invention at a fixed fourth speed mode.

Referring to FIG. 3 and FIG. 10, the first clutch CL1 and the first brake BK1 are operated at the fixed fourth speed mode.

Then, the first planetary gear set PG1 and the second planetary gear set PG2 are operated by four rotation elements by operation of the first clutch CL1.

At this state, torque of the engine ENG is input to the first ring gear R1 and the first planet carrier PC1 and the second sun gear S2 are operated as the fixed element by operation of the first brake BK1. Therefore, an increased speed by a predetermined speed ratio is output. That is, overdrive mode with a fixed speed ratio is achieved.

Various embodiments of the present invention achieve multi-mode type where fixed speed ratios and variable speed ratios are combined. Therefore, high efficiency may be achieved at all the speed ratios of a vehicle and fuel economy may be improved.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A power transmission system of a hybrid electric vehicle, comprising:
    a first planetary gear set having a first sun gear, a first planet carrier, and a first ring gear as rotation elements thereof;
    a second planetary gear set having a second sun gear, a second planet carrier, and a second ring gear as rotation elements thereof;
    first and second motor/generators adapted to be operated as a motor or a generator;
    a torque delivery apparatus including first and second clutches and first and second brakes,
    wherein the first sun gear is directly connected to the second planet carrier,
    the first planet carrier is selectively connected to the second sun gear by interposing the first clutch therebetween and is directly connected to the first motor/generator,
    the first ring gear is connected to an input shaft and is selectively connected to the second motor/generator by interposing the second clutch therebetween,
    the second sun gear is selectively connected to a transmission housing through the first brake,
    the second planet carrier is connected to an output gear, and
    the second ring gear is directly connected to the second motor/generator and is selectively connected to the transmission housing through the second brake.

2. The power transmission system of claim 1, wherein the first planetary gear set is a double pinion planetary gear set and the second planetary gear set is a single pinion planetary gear set.

3. The power transmission system of claim 1, wherein the first brake is operated at an Electric Vehicle (EV) mode,
    the first brake is operated at an input split mode,
    the first clutch is operated at a compound split mode,
    the second clutch is operated at an output split mode,
    the first clutch and the second brake are operated at a fixed first speed mode,
    the second clutch and the first brake are operated at a fixed second speed mode,
    the first clutch and the second clutch are operated at a fixed third speed mode, or
    the first clutch and the first brake are operated at a fixed fourth speed mode.

4. A power transmission system of a hybrid electric vehicle, comprising:
    an input shaft adapted to receive a torque of an engine;
    a first planetary gear set having first, second, and third rotation elements, wherein the third rotation element is fixedly connected to the input shaft and the second rotation element is fixedly connected to a first motor/generator;
    a second planetary gear set having fourth, fifth, and sixth rotation elements, wherein the fourth rotation element is selectively connected to the second rotation element of the first planetary gear set, the fifth rotation element is directly connected to the first rotation element of the first planetary gear set, and the sixth rotation element is fixedly connected to a second motor/generator;
    an output gear connected to the fifth rotation element of the second planetary gear set;
    a first clutch adapted to selectively connect the second rotation element of the first planetary gear set with the fourth rotation element of the second planetary gear set;
    a second clutch adapted to selectively connect the third rotation element of the first planetary gear set with the second motor/generator;
    a first brake interposed between the fourth rotation element of the second planetary gear set and a transmission housing; and
    a second brake interposed between the sixth rotation element of the second planetary gear set and the transmission housing;

wherein the first planetary gear set is a double pinion planetary gear set and the second planetary gear set is a single pinion planetary gear set; and wherein the first, second, and third rotation elements of the first planetary gear set are a first sun gear, a first planet carrier, and a first ring gear respectively and the fourth, fifth, and sixth rotation elements of the second planetary gear set are a second sun gear, a second planet carrier, and a second ring gear respectively.

\* \* \* \* \*